United States Patent [19]

Davis et al.

[11] Patent Number: 5,005,702
[45] Date of Patent: Apr. 9, 1991

[54] PORTABLE FOOD/WRITING TRAY

[76] Inventors: Mark S. Davis; Patricia S. Davis, both of 1632 S. Primrose, Alhambra, Calif. 91803

[21] Appl. No.: 478,208

[22] Filed: Feb. 9, 1990

[51] Int. Cl.⁵ ............................................. B65D 6/04
[52] U.S. Cl. .................................... 206/562; 108/43; 206/522; 206/557
[58] Field of Search .................. 108/43, 44; 206/557, 206/563, 564, 523, 522, 562; 224/42.42

[56] References Cited

U.S. PATENT DOCUMENTS

| | | |
|---|---|---|
| 527,108 | 10/1894 | Cooper . |
| 2,039,922 | 5/1936 | Neats et al. . |
| 2,640,747 | 6/1953 | Bodenhoff . |
| 3,102,500 | 9/1963 | Shaw . |
| 3,110,397 | 11/1963 | Peck et al. ............ 224/42.42 R |
| 3,233,563 | 2/1966 | Mauchline . |
| 3,244,125 | 4/1966 | Mackey . |
| 3,318,456 | 5/1967 | Lipe . |
| 3,331,494 | 7/1967 | Gregg, Jr. ............ 224/42.42 R |
| 3,656,193 | 4/1972 | Schneider et al. .......... 206/562 |
| 3,785,300 | 1/1974 | Anderson . |
| 4,010,696 | 3/1977 | Priesman . |
| 4,235,472 | 11/1980 | Sparks et al. ................ 108/43 X |
| 4,359,004 | 11/1982 | Chappell . |
| 4,537,646 | 8/1985 | Hoyle . |
| 4,659,099 | 4/1987 | Malone . |
| 4,765,583 | 8/1988 | Tenner ........................ 108/43 X |
| 4,788,916 | 12/1988 | Saxton ............................ 108/43 |
| 4,790,041 | 12/1988 | Shtull ......................... 108/43 X |
| 4,858,755 | 8/1989 | Kuivanen .................... 206/522 X |

FOREIGN PATENT DOCUMENTS

| | | |
|---|---|---|
| 303745 | 2/1989 | European Pat. Off. ............ 206/557 |
| 1461685 | 9/1969 | Fed. Rep. of Germany . |
| 136726 | 7/1979 | Fed. Rep. of Germany ...... 206/562 |
| 2140290 | 11/1984 | United Kingdom .................. 108/43 |

Primary Examiner—William I. Price
Attorney, Agent, or Firm—Fulwider, Patton, Lee & Utecht

[57] ABSTRACT

A portable tray comprising a tray body and legs extending outward therefrom, the tray body and legs each having a core of a resiliently compressive matrix and an outer layer of visco-elastic material. A second embodiment comprises a tray body formed of a first air-filled chamber. Second and third air-filled chambers are mounted to the first air-filled chamber and spaced apart from one another to straddle the user's legs.

7 Claims, 2 Drawing Sheets

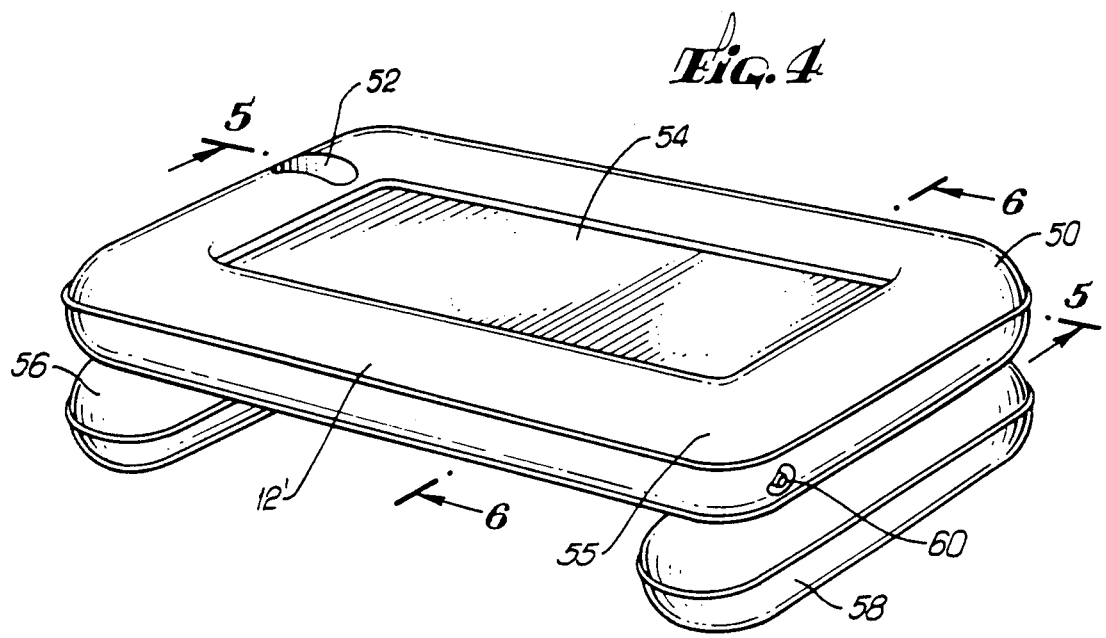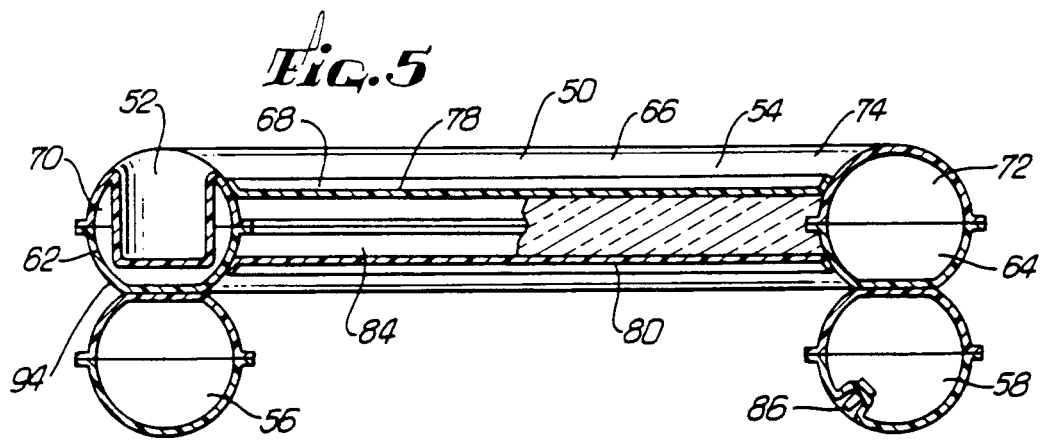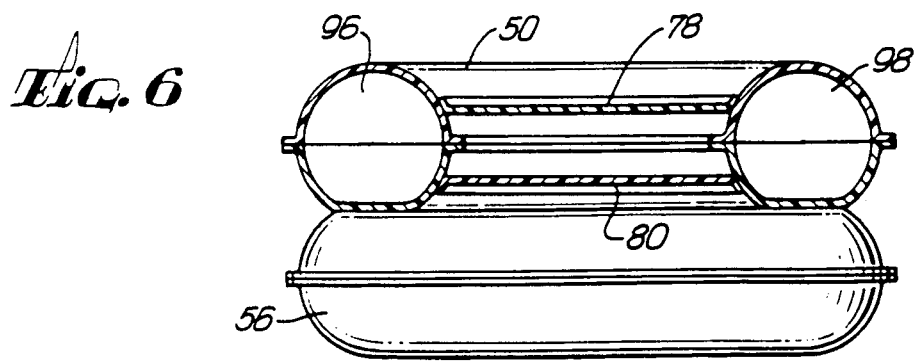

PORTABLE FOOD/WRITING TRAY

BACKGROUND OF THE INVENTION

This application relates generally to support devices and, more particularly, to a new and improved device for supporting food and drink in vehicles.

People may spend quite some time in vehicles traveling from one place to another. During this period they may want a flat surface upon which to eat, drink or write. This need may arise while the vehicle is in transit or, out of convenience, when stationary. As a result, the operators, while in a sitting position within the vehicle, may want some place upon which to rest the utensils and the plate carrying food. This surface will also catch food crumbs which may be inadvertently dropped during eating.

Responsive to this problem, various solutions have been proposed. For example, foldable table units mounted to the vehicle's seat or floor have been described. These table units may be mounted to a fixed reference point and thus extend or pivot into a generally horizontal position before the user and, upon the end of such need, would fold away into a less obtrusive position. Alternatively, various types of trays may be used to rest upon the lap or before the operator. These trays tend to have a substantially planar eating surface with a variety of supports depending from the bottom side of the tray body.

However, numerous problems have arisen in conjunction with the above solutions to these problems. For example, the fixed mounting of the particular portable table to the vehicle may create some problems. For example, fixed mounting might facilitate the unfavorable transmission of vibration to the operator or user while writing or eating upon such surface. Furthermore, because the frictional coefficient of hard plastics and metal tends to be on the low side, materials tend to slide around on the surface and make it difficult to use the surface for its intended purpose. Finally, hard plastics and metals generally to have relatively hard edges. These edges could result in injury to the user or others upon unintentional contact with the tray caused by a sudden acceleration or deceleration of the vehicle or by the tray being thrown by a juvenile user.

There exists, therefore, a significant longfelt need for an improved vehicle food tray for safe, dampened and frictional support of food while eating within the vehicle or in a general sitting position. The portable food tray of the present invention clearly fulfills all of these needs and provides further related advantages.

SUMMARY OF THE INVENTION

Briefly, and in general terms, the present invention provides a new and improved food tray for supporting food and drink in vehicles.

Basically, the present invention is directed to an improved portable tray which incorporates a damping or shock absorber into the construction of the tray.

In one preferred embodiment, by way of example and not necessarily by way of limitation, the portable tray device includes a core having a resiliently compressible gas, impregnated cell matrix. A first and second leg extend outward in the same direction from generally opposite ends of the tray body and are spaced a part from one another a sufficient distance to straddle the legs of the operator. A layer of visco-elastic material substantially surrounds the core matrix to provide a surface with a high frictional coefficient.

In an alternative embodiment, a generally planar tray body is formed having a resiliently compressible air-filled chamber with a first end and a second end. Second and third air-filled chambers are mounted to and extend generally perpendicularly outward in the same direction from the first and second ends, respectively. The second and third air-filled chambers are spaced apart from one another a sufficient distance to straddle the legs of the operator.

Other features and advantages of the present invention will become more apparent from the following more detailed description taken in conjunction with the accompanying drawings, which illustrate, by way of example, the principles of the invention.

BRIEF DESCRIPTION OF THE DRAWINGS

FIG. 4 is a generally perspective view of another embodiment of the tray device constructed in accordance with the present invention;

FIG. 5 is fragmentary a front transverse sectional view of the tray of FIG. 4 taken substantially along the lines 5—5 of FIG. 4; and FIG. 6 shows a side sectional view taken substantially along the lines 6—6 of FIG. 4.

DETAILED DESCRIPTION OF THE INVENTION

As shown in the exemplary drawings, an improved portable tray constructed in accordance with the present invention, provides a safe, portable surface upon which to eat or write.

Figure 1:
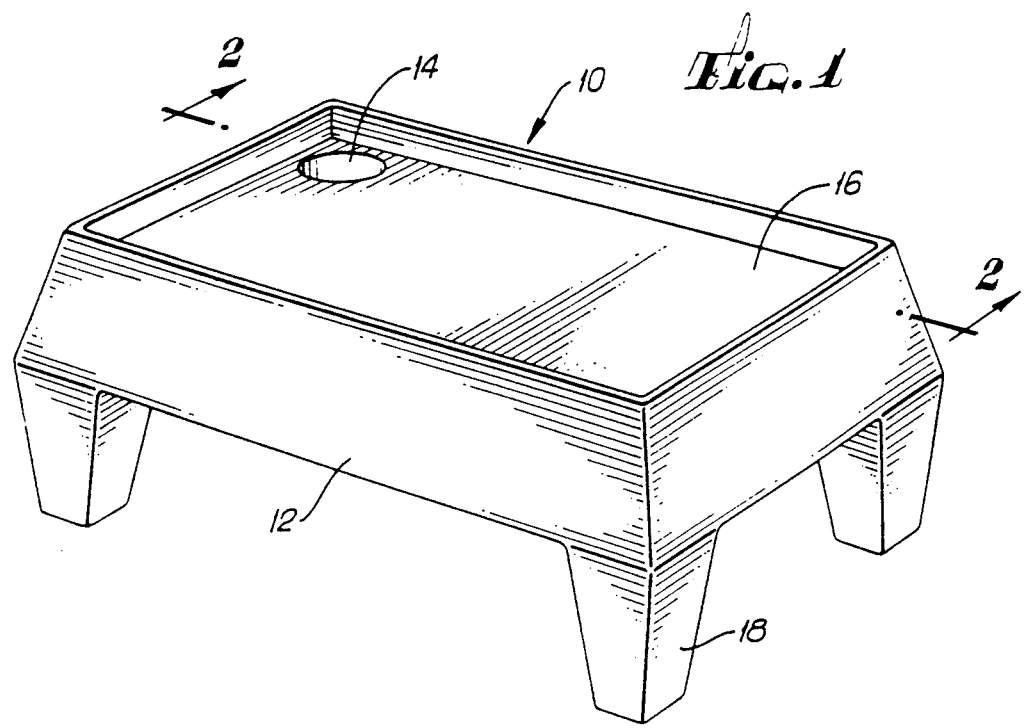
FIG. 1 is a generally perspective view of a portable tray device constructed in accordance with the present invention.

As shown in FIG. 1, the portable apparatus 10 for providing a flat surface upon the lap of an operator (not shown) includes a tray body 12. A cup recess 14 and a surface depression 16 are defined within the tray body 12 for selective receipt of containers and utensils therein. Legs 18 extend outward from the tray body 12 in a first direction to provide support therefor.

Figure 2:
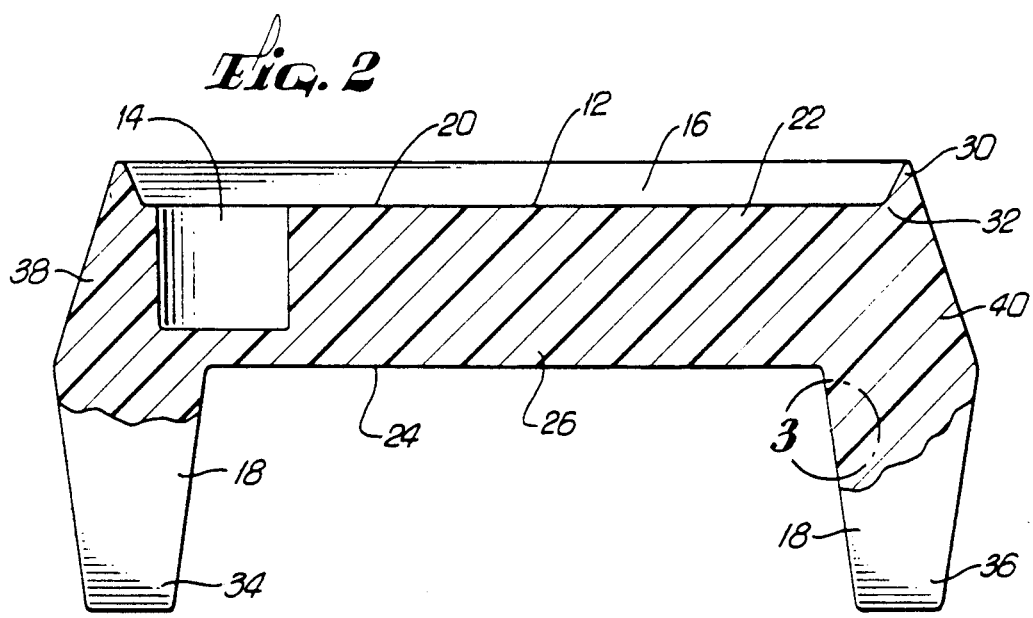
FIG. 2 is a fragmentary front sectional transverse view of the tray shown in FIG. 1 taken substantially along the lines 2—2 of FIG. 1.

Referring now to FIG. 2, in the preferred embodiment, the tray body 12 includes a generally planar first or top surface 20 on a first or top tray body side 22 and a second or bottom surface 24 on a second or substantially opposite tray body side 26 from the first. In one preferred embodiment, the tray body 12 is generally rectangular, about eighteen inches in length by about twelve inches in width, having a thickness of about two and one-quarter inches. A beveled ridge 30 is circumferentially positioned about the outside edge 32 of the top surface 20 of the tray body 12 to define the surface depression 16. The beveled ridge 30 may be integrally formed with the tray body 12, about one inch wide and extend about three-quarters of an inch from the top surface 20. By this construction, items placed within the surface depression 16 will be prevented from sliding off the top surface 20. In addition, food or drink spilled atop the surface 14 will be retained within the surface depression 16. In one preferred embodiment, the cup recess 14 is defined within the top surface 20 and may be in the form of a generally cylindrical recess about three inches in diameter and having a depth of about one and three-quarter inches. The cup recess 14 may be made smaller than that of the circumference or diameter of the desired cup (not shown) to snugly, frictionally engage the cup (not shown) within the recess.

As shown in FIG. 2, the plurality of legs 18 provide support for the tray body 12. These legs 18 may include at least one but preferably a first and second pair of legs 34 and 36, respectively, and be formed or molded integrally with the tray body 12. The first and second pairs of legs 34 and 36 may be positioned at opposite first and second ends, 38 and 40, respectively, of the tray body 12, to maintain the tray body in a substantially horizontal position. The legs 18 are extending downward from the bottom surface 24 and extend downward in a first direction substantially opposite from top surface 20. The legs 18 extend downward generally perpendicular to the bottom surface 24 and are spaced a part from one another in a generally parallel orientation to straddle the legs of the user (not shown).

Figure 3:
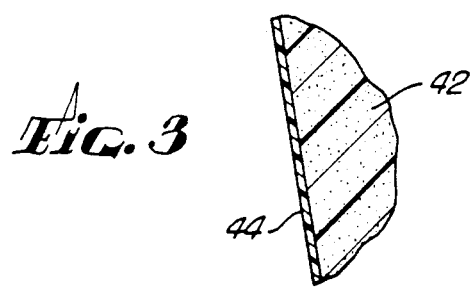
FIG. 3 is an enlarged fragmentary side elevational view taken substantially from the circle of FIG. 2.

As shown in FIG. 3, both the tray body 12 and legs 18 include a core 42 of a resiliently compressible, gas impregnated matrix. In this embodiment, such matrix may be in the form of sponge, polyurethane or foam rubber, e.g., manufactured by Foam Molders of Cerritos, Calif. or Treadstone Industries of the City of Industry, Calif. Generally, the matrix includes a plurality of air pockets defined by flexible interconnecting interior walls. As a result, the core 42 includes a compressively resilient elastic matrix which, after the application of sufficient force to initially deform the core, will substantially return to the original dimensions without substantial deformation or failure by yielding or fracture of the core. In one embodiment, the user could compress the core 42 to about 50 to about 80% of the original, uncompressed dimensions and, upon release from such compressive pressure, experience a return or recovery to about ninety to about one-hundred percent of the pre-compression dimensions within about thirty to about sixty seconds. For example, a two and one-half inch thick tray body 12 compressed by hand to a thickness of about two inches, upon removal of such compressive force, will essentially return to the original dimensions, i.e., about two-and-one-half inches thick. Formed or layered on the exterior of such core 42 is an outer layer 44 of visco-elastic material, e.g., vulcanized rubber or latex. Both the matrix core and the outer layer of visco-elastic material dampen the vibrations and shocks applied to the tray body 12 or legs 18. Furthermore, the compressive resiliency of the core 42 and the outer layer 44 minimizes injuries which can arise from impact with the portable apparatus, such as when the vehicle is subjected to sudden acceleration or deceleration or when the tray 10 has been thrown. The core 42 and the outer layer 44 also provide the additional benefit of thermal insulation which reduces conductive heat transfer protecting the user from hot or cold food and helps retain the food's desired temperature.

In an alternative embodiment, as shown in FIG. 4, the tray body 12' includes a first air-filled chamber 50. Cup recess 52 and surface depression 54 are defined within the top or first surface 55 of the tray body 12'. Second and third air chambers 56 and 58, mounted to the first air chamber 50, support the tray body 12'. Air valve 60 fluidly connects the interior of the first air-filled chamber 50 with the exterior to allow air to be selectively added or withdrawn. The air valve may be constructed to allow recess into the surface of the tray body when not in use.

As best shown in FIG. 5, the first air-filled chamber 50 has a first end 62 and a second end 64, the second end being substantially opposite the first end. In one preferred embodiment, the first air-filled chamber 50 is in the form of a rectangular, donut-shaped member having a peripheral chamber portion 66 defining an interior passageway 68 therethrough. The peripheral chamber portion 66 may have first and second side portions 70 and 72, respectively. Still referring to FIG. 5, extending across the passageway 68, between the opposite side portions 70 and 72 of the peripheral member, is first connecting panel 78. Second connecting panel 80 also extends across the passageway 68 between opposite side portions 70 and 72 and is spaced apart from the first connecting panel 78 to define an interior cavity 84 therebetween. The second connecting panel 80 may be substantially parallel to the first connecting panel 78. Interior cavity 84 may be filled with temperature insulative material, e.g., foam rubber, to isolate items placed thereupon from the operator's lap there below and to maintain the temperature of food or drink placed thereon. The top surface of the first connecting panel 78 may include a material which has a high frictional coefficient to facilitate the frictional engagement by items resting upon the surface of the connecting panel 78 and reduce the sliding of such items thereupon. Cup recess 52 is defined in the top surface of the first end 62 of the peripheral chamber member 66 for snug, frictional receipt of a container (not shown) therein.

Second and third air-filled chambers 56 and 58, as best shown in FIG. 5, provide support for the first air-filled chamber 50. The second and third air-filled chambers 56 and 58 are mounted to a first or bottom side 94 of the first air-filled chamber 50 to extend outward in a first direction from the first air-filled chamber 50. The second and third air-filled chambers 56 and 58, respectively, are spaced apart from one another a sufficient distance to straddle the lap of the operator, for example from about 14 to about 16 inches. Each chamber may have an air valve 86 to allow the inflation or deflation of the chambers. The air valve 86 fluidly communicates the interior of the second and third air-filled chambers 56 and 58 with the exterior. In one preferred embodiment, the second and third air-filled chambers 56 and 58 are in the form of substantially identically dimensioned cylindrical members and mounted generally parallel to one another to the bottom side 94 of the first air-filled chamber 50. The side chamber portions are connected by longitudinal portions 74.

As best shown in FIG. 6, the second and third air-filled chambers have a length substantially equal to the width of the first chamber 50, e.g., about twelve inches wide. Longitudinal portions 74 may include a first and second longitudinal portions 96 and 98 which are integral with the side chamber portions 70 and 72. Connecting panels 78 and 80 are also mounted to and extend between the first and second longitudinal portions 76 and 78.

By this construction, the tray apparatus 10 is elastically compressible, such that the tray 10, upon impact with the operator, will deform a sufficient amount upon impact and resiliently return to the original, at rest dimensions of the portable tray 10, to minimize injury resulting from inadvertent impact with the operator. For example, upon the application of hand pressure, the tray apparatus will compress and deform about one inch and resiliently return to substantially the original dimensions upon release from such force.

It will be apparent from the foregoing that, while particular forms of the invention have been illustrated and described, various modifications can be made without departing from the spirit and scope of the invention. Accordingly, it is not intended that the invention be limited, except as by the appended claims.

What is claimed is:

1. A portable tray apparatus for providing a flat surface upon the lap of an operator, said apparatus comprising:
    a tray body having damping and shock absorbing means, wherein said damping and shock absorbing means includes a first air chamber; and
    support means extending outward in a first direction from said tray body.

2. A tray apparatus as set forth in claim 1, wherein said support means includes a second and third air chambers, said second and third chambers mounted to said tray body and spaced sufficiently apart from each other to straddle the operators's legs.

3. A portable apparatus for straddling the legs of the operator and supporting food and drink upon the operator's lap comprising:
    a generally planar tray body having a core and a surface layer, said surface layer of a material with a high frictional coefficient and said core including a resiliently compressible, gas impregnated cell matrix, a first end and a second end, said first end substantially opposite said second end;
    at least a first leg extending outward in a first direction from said first end; and
    at least a second leg extending outward generally in said first direction, said second leg spaced apart from said first leg a sufficient distance to straddle the legs of the operator.

4. A portable apparatus as set forth in claim 3, wherein said matrix includes a plurality of air pockets separated by interconnecting walls.

5. A portable apparatus for supporting food and drink upon the lap of the operator, said apparatus comprising:
    a generally planar tray body having a resiliently compressible air-filled chamber, a first end and a second end, said first end substantially opposite said second end;
    a second air-filled chamber mounted to and extending outward in a first direction from said first end;
    a third air-filled chamber mounted to and extending outward in a said first direction, said third air-filled chamber spaced apart from said second air-filled chamber a sufficient distance to straddle the legs of the operator.

6. A portable apparatus as set forth in claim 5, wherein said first air-filled chamber includes a outer donut-shaped portion defining a passageway therethrough and a first and second connecting panels, said panels extending across said passageway to define a surface depression and a cavity therebetween.

7. A portable apparatus as set forth in claim 6, further including insulative means disposed within said cavity.

* * * * *